(12) United States Patent
Jeffords et al.

(10) Patent No.: US 8,462,925 B2
(45) Date of Patent: Jun. 11, 2013

(54) USER-DEFINED IDENTITY MAPPING FOR DIRECTED COMMUNICATIONS

(75) Inventors: Jason P. Jeffords, Bedford, NH (US); Kurt A. Dobbins, Bedford, NH (US)

(73) Assignee: Cloudtree, LLC, Waltham, MA (US)

( * ) Notice: Subject to any disclaimer, the term of this patent is extended or adjusted under 35 U.S.C. 154(b) by 251 days.

(21) Appl. No.: 12/869,476

(22) Filed: Aug. 26, 2010

(65) Prior Publication Data

US 2012/0051529 A1 Mar. 1, 2012

(51) Int. Cl.
*H04M 1/56* (2006.01)
*H04M 15/06* (2006.01)
*H04M 3/42* (2006.01)

(52) U.S. Cl.
USPC ............ 379/142.06; 379/142.01; 379/211.02

(58) Field of Classification Search
USPC ................. 379/142.01, 142.06, 142.07, 177, 379/201.02, 207.15, 211.01, 211.02, 221.01
See application file for complete search history.

(56) References Cited

U.S. PATENT DOCUMENTS

| | | | |
|---|---|---|---|
| 2005/0232225 A1* | 10/2005 | Pelaez et al. | 370/351 |
| 2005/0254638 A1* | 11/2005 | Mahajan et al. | 379/211.01 |
| 2007/0127656 A1* | 6/2007 | Citron et al. | 379/142.01 |
| 2007/0206748 A1* | 9/2007 | Cassanova et al. | 379/142.01 |
| 2009/0214013 A1* | 8/2009 | Cassanova et al. | 379/142.04 |
| 2010/0080376 A1* | 4/2010 | Hartley et al. | 379/211.02 |
| 2010/0098229 A1* | 4/2010 | Sakata et al. | 379/142.04 |

* cited by examiner

*Primary Examiner* — Quoc D Tran
(74) *Attorney, Agent, or Firm* — Preti Flaherty Beliveau & Pachios LLP

(57) ABSTRACT

Methods and systems for mapping user-defined identities in data communication networks. By mapping and translating identities based on a calling party identifier, a called party identifier, and the carrier instance, enhanced communication services are enabled. Enhanced communication services offer virtual private phone numbers, shared group numbers, and interconnection between different voice and messaging services and applications.

12 Claims, 24 Drawing Sheets

| Tuple Policy Table 302 | | |
|---|---|---|
| Tuple Key 304 | Parallel Mappings List Field 306 | Serial Mappings List Field 308 |
| 304.1 | 306.1 | 308.1 |
| *** | | |
| 304.n | 306.n | 308.n |

301.1 points to the first row; 301.n points to the last row.

FIG. 3

| Canonical User Table 502 | User Canonical Identity Field 504 | User Carrier Instance Field 506 | User Display Name Field 508 | User UUID Field 510 | User Credentials Field 512 | User Identities Field 514 | User Friends Field 516 |
|---|---|---|---|---|---|---|---|
| 1 | 504.1 | 506.1 | 508.1 | 510.1 | 512.1 | 514.1 | 516.1 |
| *** | | | | | | | |
| n | 504.n | 506.n | 508.n | 510.n | 512.n | 514.n | 516.n |

501.1 (row 1), 501.n (row n)

FIG. 5

Canonical User Table 502.1

| User Canonical Identity Field 504 | User Carrier Instance Field 506 | User Display Name Field 508 | User UUID Field 510 | User Credentials Field 512 | User Identities Field 514 | User Friends Field 516 |
|---|---|---|---|---|---|---|
| 1 bsmith@att.cloudtree.net | ATT | Bob Smith | UHV-1 | ****** | -> 602.1 | -> 702.1 |
| 2 mjones@att.cloudtree.net | ATT | Mary Jones | UHV-2 | ****** | -> 602.2 | -> 702.2 |
| 3 jjones@att.cloudtree.net | ATT | Jeff Jones | UHV-3 | ****** | -> 602.3 | -> 702.3 |
| 4 freddy@att.cloudtree.net | ATT | Freddy | UHV-4 | ****** | -> 602.4 | -> 702.4 |
| 5 jgreen@att.cloudtree.net | ATT | Joe Green | UHV-5 | ****** | -> 602.5 | -> 702.5 |

| Identity Table 602 | | | | | | | | |
|---|---|---|---|---|---|---|---|---|
| | Identity Count 604 | | | | | | | |
| | Identity UUID Field 606 | Identity Carrier Instance Field 608 | Identity Protocol ID Field 610 | Identity URI Value Field 612 | Identity Type Endpoint Device Field 614 | Identity Codec Field 616 | Identity Presence Status Field 618 | Identity Access Filter Field 620 | Identity Mapping Field 622 |
| 1 | 606.1 | 608.1 | 610.1 | 612.1 | 614.1 | 616.1 | 618.1 | 620.1 | 622.1 |
| *** | | | | | | | | | |
| n | 606.n | 608.n | 610.n | 612.n | 614.n | 616.n | 618.n | 620.n | 622.n |

| | Identity UUID 606 | Identity Carrier Instance 608 | Identity Protocol ID 610 | Identity URI Value 612 | Identity Type Endpoint Device 614 | Identity Codec 616 | Identity Presence Status 618 | Identity Access Filter 620 | Identity Mapping 622 |
|---|---|---|---|---|---|---|---|---|---|
| 1 | 602.1.HV.1 | ATT | SIP | 978.111.1234 | cell phone | G.711 | ON LINE | SPECIFIC FRIENDS | *** |
| 2 | 602.1.HV.2 | ATT | SIP | 978.111.2345 | home phone | G.711 | ON LINE | SPECIFIC FRIENDS | *** |
| 3 | 602.1.HV.3 | ATT | SIP | 718.222.7890 | cell phone | G.711 | ON LINE | ALL FRIENDS | *** |
| 4 | 602.1.HV.4 | ATT | SIP | 718.222.3344 | cell phone | G.711 | ON LINE | SPECIFIC FRIENDS | *** |
| 5 | 602.1.HV.5 | ATT | SKYPE | bsmith | computer | SILK | INVISIBLE | ALL FRIENDS | -*** |
| 6 | 602.1.HV.6 | ATT | SKYPE | maryjones | computer | SILK | INVISIBLE | ANY | *** |
| | Identity Count 604 | | | | | | | | |

Identity Table 602.1

FIG. 6-1

| | Identity UUID Field 606 | Identity Carrier Instance Field 608 | Identity Protocol ID Field 610 | Identity URI Value Field 612 | Identity Type Endpoint Device Field 614 | Identity Codec Field 616 | Identity Presence Status Field 618 | Identity Access Filter Field 620 | Identity Mapping Field 622 |
|---|---|---|---|---|---|---|---|---|---|
| 1 | 602.2.HV.1 | -> 902.1 | SIP | 978.111.1234 | cell phone | G.711 | ON LINE | SPECIFIC FRIENDS | *** |
| 2 | 602.2.HV.2 | -> 902.1 | SIP | 603.123.4567 | home phone | G.711 | ONLINE | ANY | *** |
| 3 | 602.2.HV.3 | -> 902.1 | SKYPE | bsmith | computer | SILK | INVISIBLE | ALL FRIENDS | *** |

Identity Table 602.2

FIG. 6-2

| | Identity UUID Field 606 | Identity Carrier Instance Field 608 | Identity Protocol ID Field 610 | Identity URI Value Field 612 | Identity Type Endpoint Device Field 614 | Identity Codec Field 616 | Identity Presence Status Field 618 | Identity Access Filter Field 620 | Identity Mapping Field 622 |
|---|---|---|---|---|---|---|---|---|---|
| 1 | 602.3.HV.1 | -> 902.1 | SIP | 603.555.6789 | virtual | G.711 | ON LINE | SPECIFIC FRIENDS | *** |
| 2 | 602.3.HV.2 | -> 902.1 | SKYPE | maryjones | computer | SILK | INVISIBLE | SPECIFIC FRIENDS | *** |

Identity Table 602.3

FIG. 6-3

| Friends Mapping Table 702 | | | |
|---|---|---|---|
| Friend Count 704 | Friend Display Name Field 706 | Friend UUID Field 708 | Friend Identities Field 710 |
| 1 | 706.1 | 708.1 | 710.1 |
| *** | | | |
| n | 706.n | 708.n | 710.n |

702.1 corresponds to row 1; 702.n corresponds to row n.

FIG. 7

| Mapping Entry Table 802 | | | | | |
|---|---|---|---|---|---|
| Mapping Count 804 | | | | | |
| | In-Identity UUID Field 806 | Out-Identity UUID Field 808 | Priority Field 810 | Serial or Parallel Field 812 | Permit-Deny Schedule Field 814 |
| 1 (801.1) | 806.1 | 808.1 | 810.1 | 812.1 | 814.1 |
| *** | | | | | |
| n (801.n) | 806.n | 808.n | 810.n | 812.n | 814.n |

FIG. 8

| In-Identity UUID Reference Field 806 | Out-Identity UUID Reference Field 808 | Priority Field 810 | Serial or Parallel Field 812 | Permit-Deny Schedule Field 814 |
|---|---|---|---|---|
| 1<br>key=[att, SIP, bmsith@att.cloudtree.net, mjones@att.cloudtree.net] | SIP<br>603.555.6789 | SKYPE<br>"maryjones" | NORMAL | SERIAL | PERMIT<br>00:00 to 24:00<br>MTWTFSS |
| 2<br>key=[att, SIP, bmsith@att.cloudtree.net, freddy@att.cloudtree.net] | SIP<br>69233 | SIP<br>978.111.2345 | NORMAL | SERIAL | PERMIT<br>00:00 to 24:00<br>MTWTFSS |
| 3<br>key=[att, SIP, , jgreen@att.cloudtree.net] | SIP<br>69233 | SIP<br>718.222.3344 | NORMAL | SERIAL | PERMIT<br>00:00 to 24:00<br>MTWTFSS |

Mapping Entry Table 802.1

FIG. 8-1

| Carrier ID Field 904 | Carrier Display Name Field 906 | Primary Trunk ID Field 908 | Secondary Trunk ID Field 910 | Authentication Field 912 |
|---|---|---|---|---|
| 904.1 | 906.1 | 908.1 | 910.1 | 912.1 |
| *** | | | | |
| 904.n | 906.n | 908.n | 910.n | 912.n |

Context Table 902

| Carrier ID Field 904 | Carrier Display Name Field 906 | Primary Trunk ID Field 908 | Secondary Trunk ID Field 910 | Authentication Field 912 |
|---|---|---|---|---|
| 1 | AT&T | 208.77.188.166 | 208.77.188.167 | ***** |
| 2 | Verizon | 172.16.254.1 | 172.16.254.2 | ***** |

Context Table 902.1

FIG. 9-1

USER-DEFINED IDENTITY MAPPING FOR DIRECTED COMMUNICATIONS

TECHNICAL FIELD

The present invention relates to user-defined identity mapping techniques in the telecommunications field.

BACKGROUND ART

Currently, a phone number provides a globally unique identifier for an endpoint in a telephone or communications network. These phone numbers are typically visible in the public domain, e.g., a phonebook or an online directory. Once a phone number is known, it can be dialed and connected to from any phone or telecommunication device in a telephone or communications network.

A phone number has a single destination or device associated with it, such as a household phone, a business phone, or a person's cell phone.

A phone number can be a private number, which restricts, or is meant to restrict, a public disclosure of the number. However, a private number, once learned, can be called or reached just like a public number or could be reached by random dialing.

A shortcoming of known systems is that phone numbers, for example, are either public or private as, currently, there is no "hybrid approach" that allows a public number to have certain attributes of being private, for example, an otherwise public phone number that is restricted from being called by a non-authorized party or device.

Another shortcoming of known systems is that a phone number cannot be duplicated as each phone number has to be unique. This means that an allocated phone number can only be assigned to one user or device at a time.

BRIEF SUMMARY OF THE INVENTION

In embodiments of the present invention, methods and systems for mapping user-defined identities in a data communication network are provided. Enhanced communications services and functions are provided by mapping and translating identities based on an identifier of the carrier, the calling party, or the called party. These enhanced communication services provide for virtual private phone numbers, shared group phone numbers, interconnections between different voice and messaging services and applications and robust parental controls.

BRIEF DESCRIPTION OF THE DRAWINGS

These and other features of the invention will become apparent from the following detailed description of the invention with reference to the attached drawings, wherein:

FIG. 3 depicts a tuple policy table for practicing a method of the invention.

FIG. 5 depicts a canonical user table for practicing a method of the invention.

FIG. 5-1 depicts an example canonical user table for practicing the method of the invention.

FIG. 6-1 depicts an example identity table for practicing a method of the invention.

FIG. 6-2 depicts an example table for practicing a method of the invention.

FIG. 6-3 depicts an example table for practicing a method of the invention.

FIG. 6-4 depicts an example table for practicing a method of the invention.

FIG. 7-1 depicts an example friends mapping table for practicing a method of the invention.

FIG. 7-2 depicts an example friends mapping table for practicing a method of the invention.

FIG. 8 depicts—a mapping entry table for practicing the method of the invention.

FIG. 8-1 depicts an example mapping table for practicing the method of the invention.

FIG. 9 depicts a context table for practicing a method of the invention.

FIG. 9-1 depicts an example context table for practicing the method of the invention.

FIG. 10-1 depicts an example canonical user table entry for practicing the method of the invention.

FIG. 10-2 depicts a mapping of data structures of called and calling parties for practicing a method of the invention.

DETAILED DESCRIPTION

Figure 1:
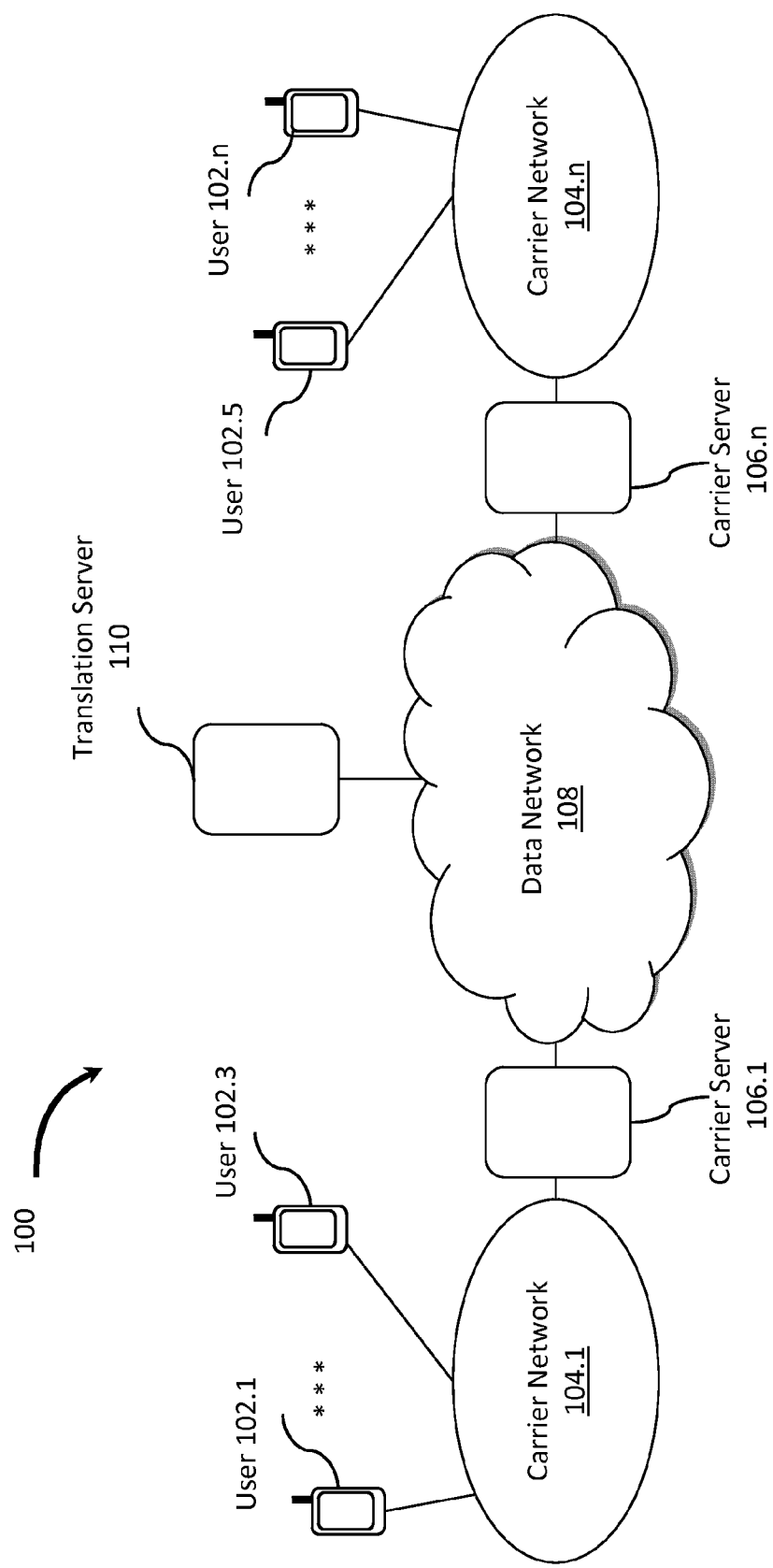
FIG. 1 depicts a plurality of communication endpoints attached to carrier networks interconnected over a data network having a translation server attached to a data network for practicing a method of the invention.

What is needed is a system that allows phone or other communications device users to define contextually-unique identifiers in voice and data communications that may be private or shared, along with policies for permitting or denying certain communications or establishing enhanced communication services.

Briefly, in accordance with an embodiment of the present invention, a method is provided for mapping user-defined identities in data communication networks.

An originating user can assign one or more identifiers for directing communications to an endpoint. Since the assignment of the identifier is unique to the source originator, the identifier and source originator pair becomes unique within the context of a specific communications exchange or data mapping and can be used to control the communication.

Assigned identities either can be mapped at multiple levels of a hierarchy in a data communications exchange, such as, for example, at an originating endpoint communication exchange, at a network attachment point of a data communications exchange, or at one or more intermediary points in the end-end communication exchange.

User-defined mappings can have a unique context or combination, sometimes referred to as a "tuple," such as the source of the communications exchange, the source carrier-network, some combination of sources, or other forms of scoping (define) the source or originating communication. By considering an assigned identifier unique as defined by its originating source, identities can be duplicated, i.e., the same identity value or identifier can be used across multiple different sources and still maintain a unique mapping because of the pairing of the identifier and its originating source.

Because user-defined identities are unique as defined by an originating source, they can be used asymmetrically for one-way mapping, or symmetrically for bi-directional mapping, where each originating source uses the same user-defined identifier value between them.

In symmetrical mapping, for example, a single private phone number, i.e., the same phone number, for example, 201.555.1234, could be used between two sources or parties P1, P2, to connect to each other. Each party P1, P2 maps the single private phone number to the destination endpoint identifier of the other party. Thus, {P1, 201.555.1234}=>P2 and {P2, 201.555.1234}=>P1 where "=>" denotes "maps to." In this mode, when either source P1, P2 dials the single private phone number, the end-points P1, P2 are connected to each other, i.e., each is using the same phone number, to call the other. The shared phone number becomes a virtual private phone number that only connects two specific endpoints, in this case, parties P1 and P2.

A single private phone number, as above, could also be mapped to several endpoints thus allowing several parties to share a virtual private phone number. This would be, effectively, a private shared party line, where a single identifier or phone number would be used to connect multiple parties.

In asymmetrical mapping, a private phone number identifier could be used by one party to identify or connect to another party while that other party uses a different number to identify or connect to the other party.

Other parties could define the same identifier, i.e., the same number, to connect to different endpoints, but would be distinguishable by the (party, identifier) pairing.

User-defined identity mapping allows the context of the source (calling party) to define the mapped identity. In this fashion, identity mapping is user-defined.

User-defined identity mapping can allow for a specific phone number, as in the example, 201.555.1234, to be oversubscribed in that the number may be directed to different devices, based on the originating party. Since the pairs are contextually unique by the {source, number} pair, one source can define a mapping of an identity value that connects to a particular first endpoint, while a different source can use the same identity value to map to a different endpoint. For example, two different sources could each define a same phone number, say, 111-222-1234, to connect to a different endpoint. The same number is dialed by each originator or source but connects to completely different endpoints because it is originating from different sources.

Other identities, or identity values, other than phone numbers, can also be mapped in this fashion, within the same communications network or network application.

Mnemonics or alpha mnemonics can also be defined by a user. For example, a phone number that spells out "mybff" could be mapped by each user to whatever identity they associated with their best friend. The pairing with the source identifier makes it unique.

Identities across communication networks or applications can also have user-defined mapping as well. For example, phone number 111.222.1234 could map to an Instant Message ID of "bob2002" which in essence provides identity transcoding. By re-mapping identities based on the user-defined mapping, or pairing, phone numbers can be used to map to non-phone number identities, such as those on social networks or voice applications that use names as identifiers, such as the Skype™ network. The Skype network is a peer-to-peer communication overlay network including voice, data, text and video.

By pairing at least a source identity and a destination identity, unique policies of communication exchanges can be defined and enforced for the pair. For example, a given source could be restricted to communication with a specific set of destinations or vice versa.

By combining identity mapping and policy rules with media bearer channels, a rich set of enhanced communication services, that would not otherwise be possible, can be enabled. For example, dialing a phone number and connecting to a Skype application user on a data network, even though the calling phone or device has no data channel, is possible. Advantageously, in one embodiment of the present invention, a phone number may be dialed and results in connecting to a gaming console user or device that is, otherwise, only addressable with a gamer login id. The present invention can resolve the connection and complete the "call."

Robust policy controls can also be provided. For example, calling parties may be limited to a set of called parties such that communication is restricted.

One or more embodiments of the present invention enable user-defined mappings of identities that can be used in data communication networks and application communication exchanges.

A presently disclosed system 100 for practicing embodiments of the present invention, referring to FIG. 1, includes user devices 102.1 . . . 102.n communicably coupled to a carrier network 104 to permit voice and/or data communication to and from the respective devices. The carrier network 104 provides communication services to devices 102 connected to the network, such as interconnection voice and data connections with devices on the same carrier network or different carrier networks. The carrier network 104 may use a variety of communication techniques, such as circuit switching or IP data networking, in order to interconnect devices for communication services. The carrier network may be a wireless phone network, a wired phone network, an internet, a public network, a private network such as Skype, an application specific network such as XBox, or a proprietary network A carrier server 106 provides connection services between elements in the carrier network 104 and a data network 108. The data network 108 may be a private data communications network or a public data communications network such as the Internet. Each carrier network 104 is in communication with a respective carrier server 106 that communicates with a translation server 110 over the data network 108. User devices 102.1 . . . 102.n, i.e., users, are communicably coupled to a carrier network 104 to permit voice and/or data communication to, and/or from, the respective devices. Only two carrier networks 104 and carrier servers 106 are illustrated for simplicity, however, it should be realized that more carrier servers in communication with other carrier networks may communicate with the translation server 110 via the data network 108. Also, it should be understood that more that one translation server 110 may be implemented.

Users 102 can either originate calls or communications as the calling party or receive calls or communications as the called party within the same carrier network or between carrier networks.

All communications with users 102, or a subset thereof, can be directed from the carrier server 106 to the translation server 110. The translation server 110 can be a single server or multiple servers having processors, memory, and network connectivity as shown in FIG. 13, manifested logically as a software instance or physically as a hardware instance, or some combination of both, such as in public or private cloud hosting cloud-computing platforms.

Figure 13:
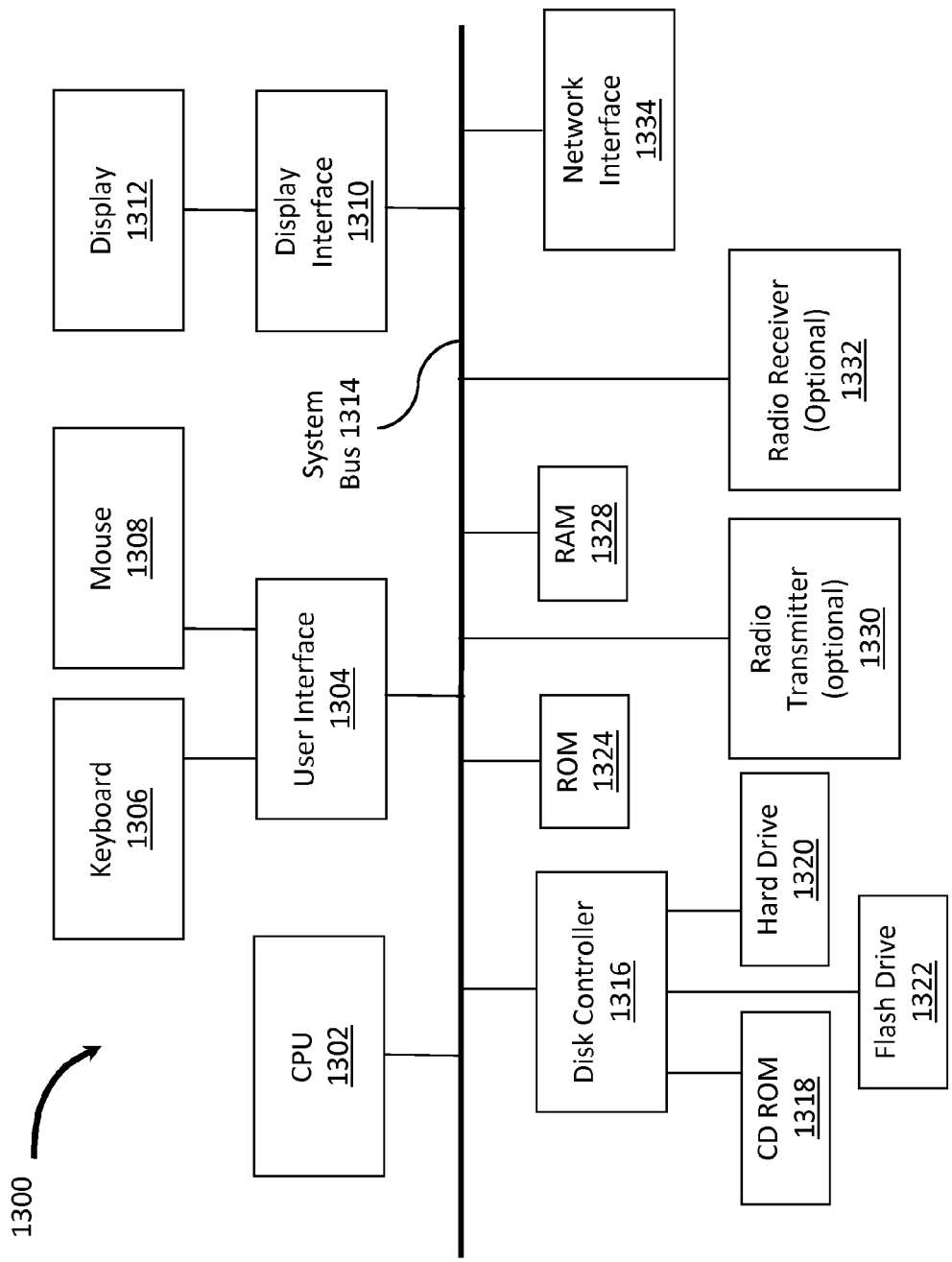
FIG. 13 depicts an example system or device for practicing a method of the invention.

The translation server 110 may include one or more systems 1300 as shown in FIG. 13. The system 1300 includes a CPU 1302, a user interface 1304 coupled to a keyboard 1306 and a mouse 1308. Further, a display interface 1310, coupled to a display 1312, is coupled, via a system bus to the CPU 1302 and the user interface 1304. A disk controller 1316, coupled to a CD ROM 1318, a hard drive 1320 and a flash drive 1322, is also coupled to the system bus 1314. ROM 1324 and RAM 1328 are connected to the system bus 1314 as is a network interface 1334. Optionally, a radio transmitter 1330 and radio receiver 1332 may be connected to the system bus 1314.

Figure 2:
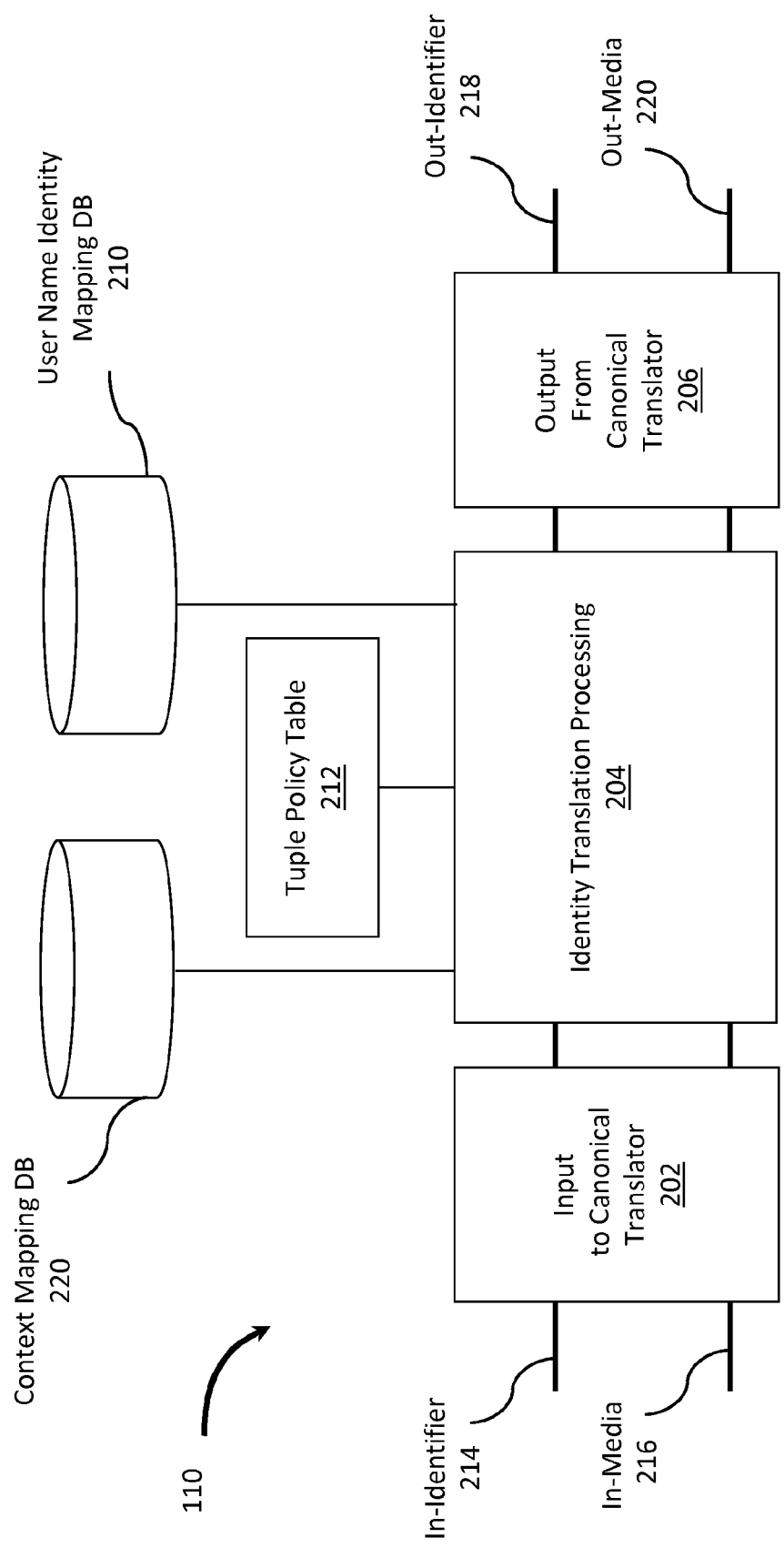
FIG. 2 depicts a high-level functional block diagram depicting the logic in the translation server of the system for practicing a method of the invention.

The translation server 110 comprises several functional components, as shown in FIG. 2, which include identity translation processing 204, a tuple policy table 212, a user name identity mapping database 210, a context mapping database 220, an input to canonical translator 202 and an output from canonical translator 206, each configured to perform as described below.

The input to canonical translator 202 takes as input an in-identifier 214, which could be a phone number of a calling party, a phone number of a called party, a combination of both, or other identifiers such as user name identifiers on social networks or voice applications that use contact lists of user names or friend names as the identity for originating or receiving calls or data communications.

The input to canonical translator 202 translates each in-identifier 214 to a canonical format for identity translation processing 204. A canonical format is a standard representation format of data for processing and is commonly used in communications to translate between different data formats. Instead of having N to N combinations, each input is translated to a standard pattern and then each output is translated from the standard pattern to the output specific format. For example, input ASCII data could be converted to a canonical format of XML for standard representation. The identity translation processing 204 performs translation of the in-identifier 214 to an out-identifier 218, based on the mappings and policies contained in the tuple policy table 212.

The identity translation processing 204 uses a tuple policy table 212, along with two databases: the user name identity mapping database 210 containing identity aliases for mapping each canonically-named identity and the context mapping database 220 containing a list of source and destination contexts for identity mapping. Finally, the output from canonical translator 206 translates each identity from a canonical format to a specific format for the intended out-identifier 218 based on protocol specific mapping and media codecs. For example, phone numbers may be translated to a SIP protocol INVITE message where the bearer channel for media transfer may be encoded using the G.711 standard.

The input to canonical translator 202 also translates each in-media identifier 216 to a canonical format for identity translation processing 204. The identity translation processing 204 performs translation of an in-media identifier 216 to an out-media identifier 220, based on the mappings and policies contained in the tuple policy table 212. Finally, the output from canonical translator 206 translates each in-media identifier 216 from a canonical format to a specific format for the intended out-media identifier 218. Here, media refers to the actual machine encoded communication exchange between two or more parties, whether it be voice, video or text.

Identity translation is defined by the tuple policy table 302, shown in FIG. 3, which contains an entry 301.*n* for each tuple key 304.1 . . . 304.*n*, along with a list of mappings to be performed simultaneously, parallel mappings 306.*n* and a list of mappings to be performed in sequence, serial mappings 308.*n*. Each entry 306.*n* is a separate mapping table (or list) of mappings to perform in parallel (refer to mapping table 802 below) and each entry 308.*n* is a separate mapping table (or list) of mappings to perform serially.

The serial and parallel mappings are defined by the mapping table 802, shown in FIG. 8, which define the in-identity and out-identity translation mappings. These entries can be pre-loaded based on user configuration basis or managed dynamically in real-time. The mapping table 802 contains an entry 801.*n* for each {in-identity, out-identity} mapping pair that is configured, mapped, or defined to a specific user's identities and friends. The Mapping Count field 804 indicates how many entries 801.*n* exist. Each entry 801.*n* contains an In-Identity UUID field 806, an Out-Identity UUID field 808, a Priority field 810, a Serial or Parallel field 812, and a Permit-Deny Schedule field 814.

The UUID is a globally unique identifier field, used internally by translations server 110, and formed using procedures well-known in the art for establishing global uniqueness. A UUID is a special type of randomly generated identifier used in software applications to provide an essentially unique reference number. The value is represented as a 32 character hexadecimal character string (not including the dashes), such as {21EC2020-3AEA-1069-A2DD-08002B30309D} and usually stored as a 128 bit integer. The primary purpose of the UUID is to provide an essentially unique number that can be used internally by the translation server 110 to represent each unique user. Ideally, a UUID will never be generated twice by any computer or group of computers in existence. The total number of unique keys or values is so large that the probability of the same UUID number being generated more than once is extremely small, and certain techniques in the art have been developed to help ensure that no numbers are duplicated.

The UUID field is used as a guaranteed unique identifier within the system such that it can be stored in an entry and referenced or it can be used as a key value. The UUID may be generated from different inputs, e.g., a hash of different fields, so it can be used in many different places as separate and unique identifiers. This is advantageous in a distributed system, i.e., where there may be no central database, as each distributed element can use the same algorithm on data and create globally unique identities.

Figure 4:
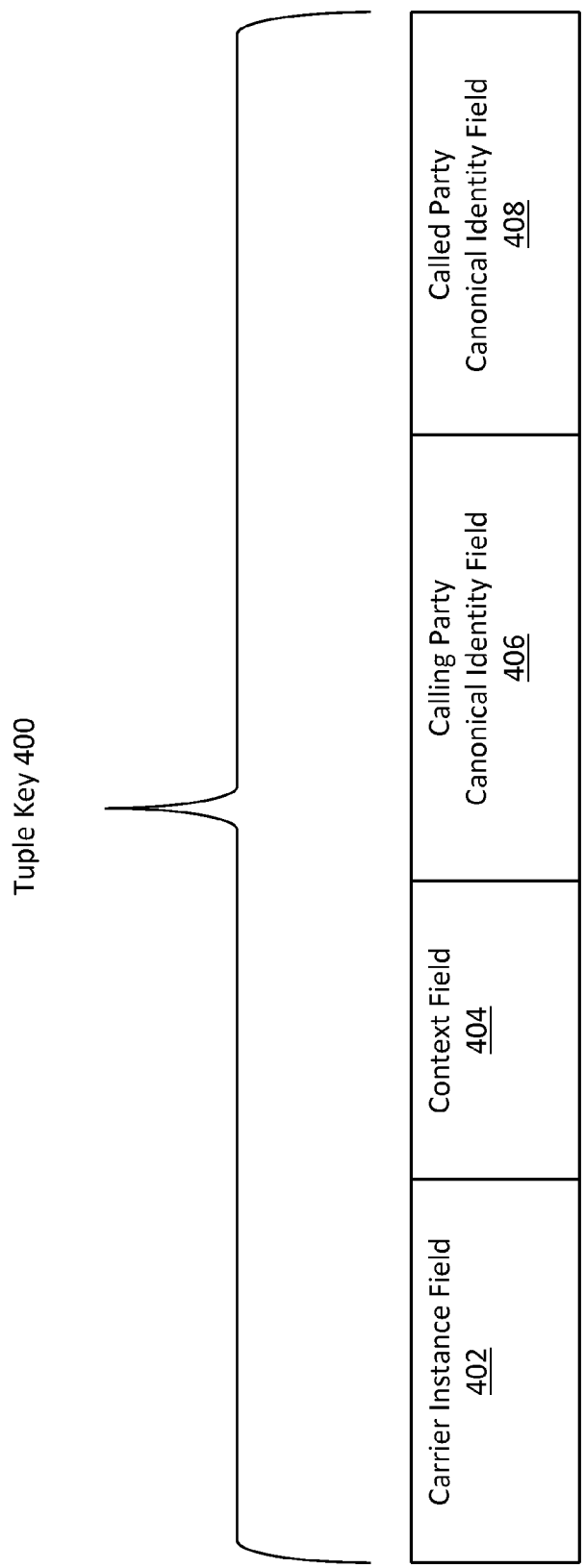
FIG. 4 depicts the makeup of a tuple key indexing the tuple policy table for practicing a method of the invention.

A tuple is an ordered list of elements and is used as a key, i.e., a tuple key 400, to uniquely define entries in the tuple policy table 212. The tuple key 400 as shown in FIG. 4, contains an ordered set of elements, a carrier instance value field 402, a context value field 404, a calling party canonical identity field 406, and a called party canonical identity field 408. By using a tuple key 400 to organize the tuple policy table 302, each entry represents a unique instance by carrier, calling party, and called party, i.e., a part of the tuple key 400, for all communications going through the translation server 110. In this fashion, each entry 301.*n* in the tuple policy table 302 defines the identity translation for the communication between the specific calling party and called party represented by the entry.

Using a tuple key 400 allows mappings, and policy application to occur based on full or partial matches of the tuple key entry 304. The tuple key 400 comprises a carrier instance 402, followed by a context 404, a calling party canonical identity 406 and a called party canonical identity 408. The carrier instance field 402 uniquely identifies a specific carrier to which user identities are attached or associated. As each key will have a unique combination of field values, unique mapping entries for a specific carrier can be defined for each carrier instance field 402. This also means that a calling party canonical identity field 406 value or a called party canonical identity field 408 value can be duplicated between different carrier instances and still be considered unique within the context of a specific carrier. In this fashion, for example, a same phone number could be used to represent different originating users, each in a different carrier network.

Likewise, by having the tuple key 400 contain the calling party canonical identity field 406 it further uniquely identifies a specific entry to which user identities are attached or associated. Similarly, unique mapping entries can be defined within each party canonical identity field 406 instance. This also means that a called party canonical identity 408 can be duplicated in value between different calling party canonical identity 406 instances and yet be considered unique within the context of a specific calling party. In this fashion, a same phone number could be used to represent different destination users, each associated with a specific calling party 406 instance, even within the same carrier network or between carrier networks. Thus, user-defined context-based phone numbers are achieved.

Finally, by having the tuple key 400 contain the called party canonical identity field 408 further uniquely identifies a specific entry to which user identities are attached or associated. Unique mapping entries can be defined for a specific carrier instance 402 and calling party canonical identity 406. In this fashion, a fully specified tuple defines a specific identity mapping and policies for the exact match of a {carrier instance 402, a context 404, a calling party canonical identity 406 and a called party canonical identity 408} tuple.

Partial matches of the tuple key 400 permit varying default configurations of mapping entries. By using a NULL value for certain fields in the tuple key 400, a variety of default mappings can be achieved. For example, by only specifying the carrier instance 402, a default mapping entry in the tuple policy table 212 can exist for a specific carrier instance 402. Likewise, for example, by specifying the carrier instance 402, the context 404, and the calling party canonical identity 406, a default mapping entry can exist for a specific carrier instance 402 and calling party canonical identity 406 with a NULL value for the called party canonical identity 406

Because different formats of an in-identifier 214 and different formats of an out-identifier 218 exist, an in-identifier 214 is first converted to a canonical format to create the tuple key. The canonical value is obtained by looking up the in-identifier 214 in the user name identity mapping database 210, which contains all of the protocol-specific identities for a canonical user identity. A canonical user table 502, shown in FIG. 5, is used to maintain user canonical configurations. The canonical identity is a means of determining a single uniform representation of the many protocol-specific values that are mapped to a user. A canonical format using a standard representation of data allows a many-to-one translation to occur on the in-identifier processing and a one-to-many translation to occur on the out-identifier processing. The efficiency of this approach becomes apparent when forming the tuple key 400 to use when accessing a tuple policy entry 301.$n$ in the tuple policy table 302. By using a canonical format in the tuple key 400, the calling party canonical identity 406 and the called party canonical identity 408 can have the same entry regardless of each field having multiple source formats. For example, referring now to FIG. 5-1 which depicts a canonical user table 502 populated with sample values for explanation purposes only. In a first entry 502.1.1, an example canonical identity 504 for a user Bill Smith would be "bsmith@att.cloudtree.net" and may have several phone numbers mapped to its identity, but the canonical format of "bsmith@att.cloudtree.net" is used in forming the tuple key 400.

Figures 4, 6:
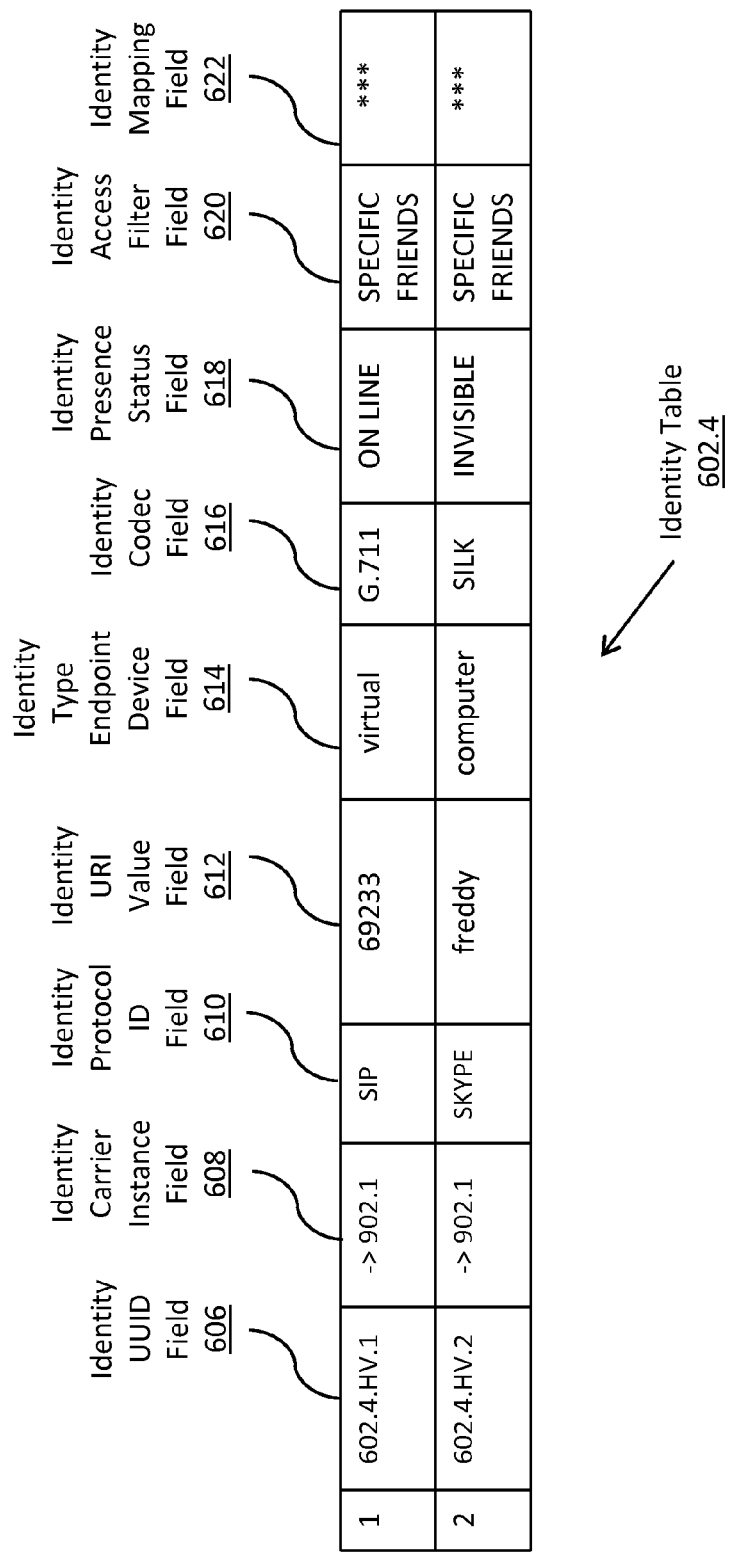
FIG. 6 depicts an identity table for practicing a method of the invention.
Figures 1, 7:
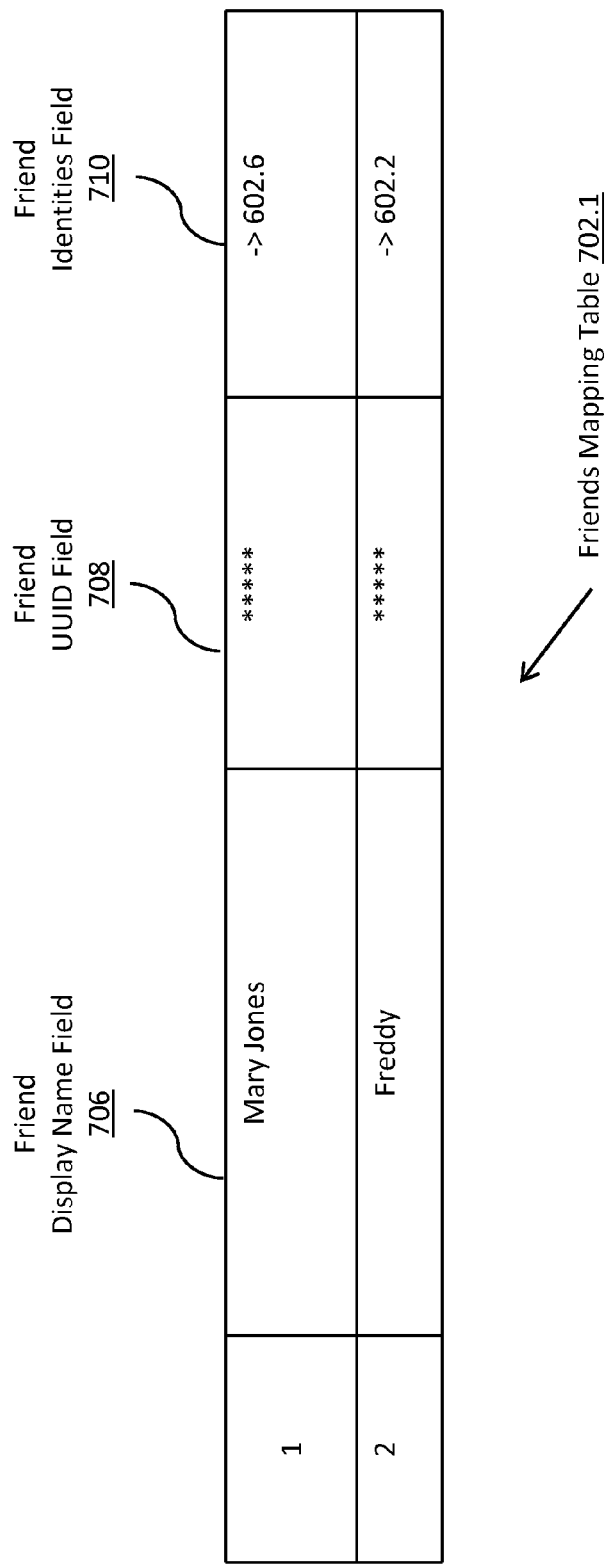
FIG. 7 depicts a friends mapping table for practicing a method of the invention.
Figures 2, 7:
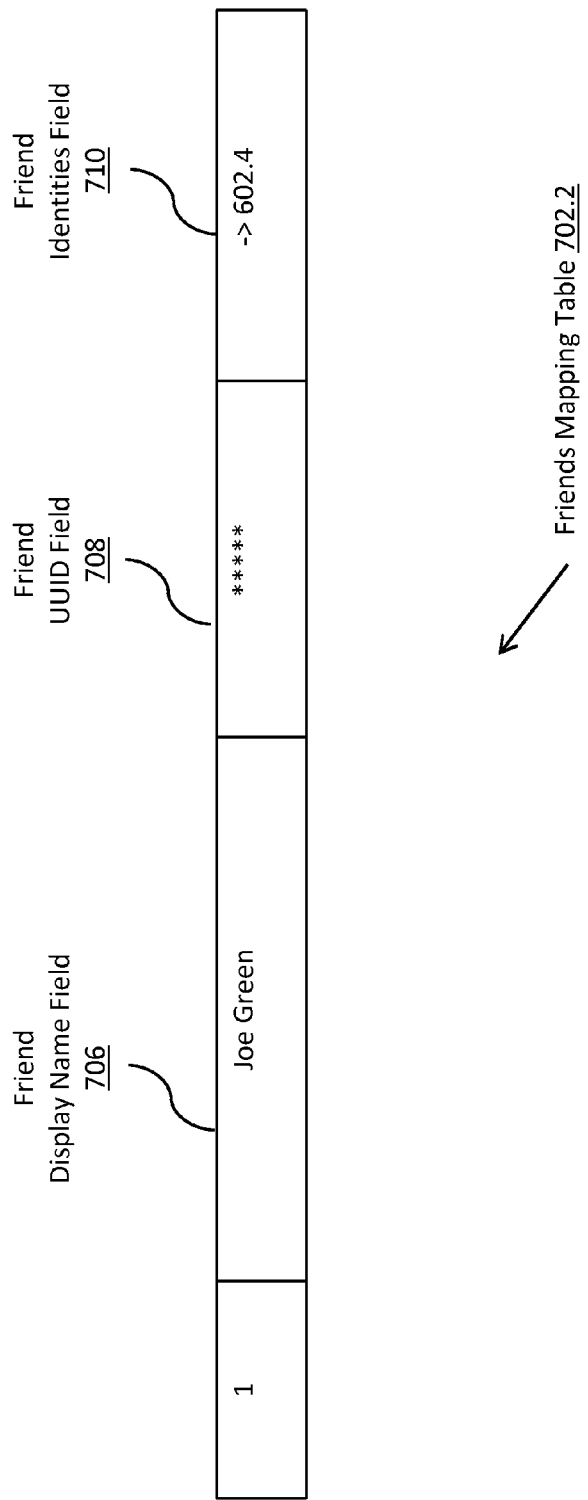
Figure 10:
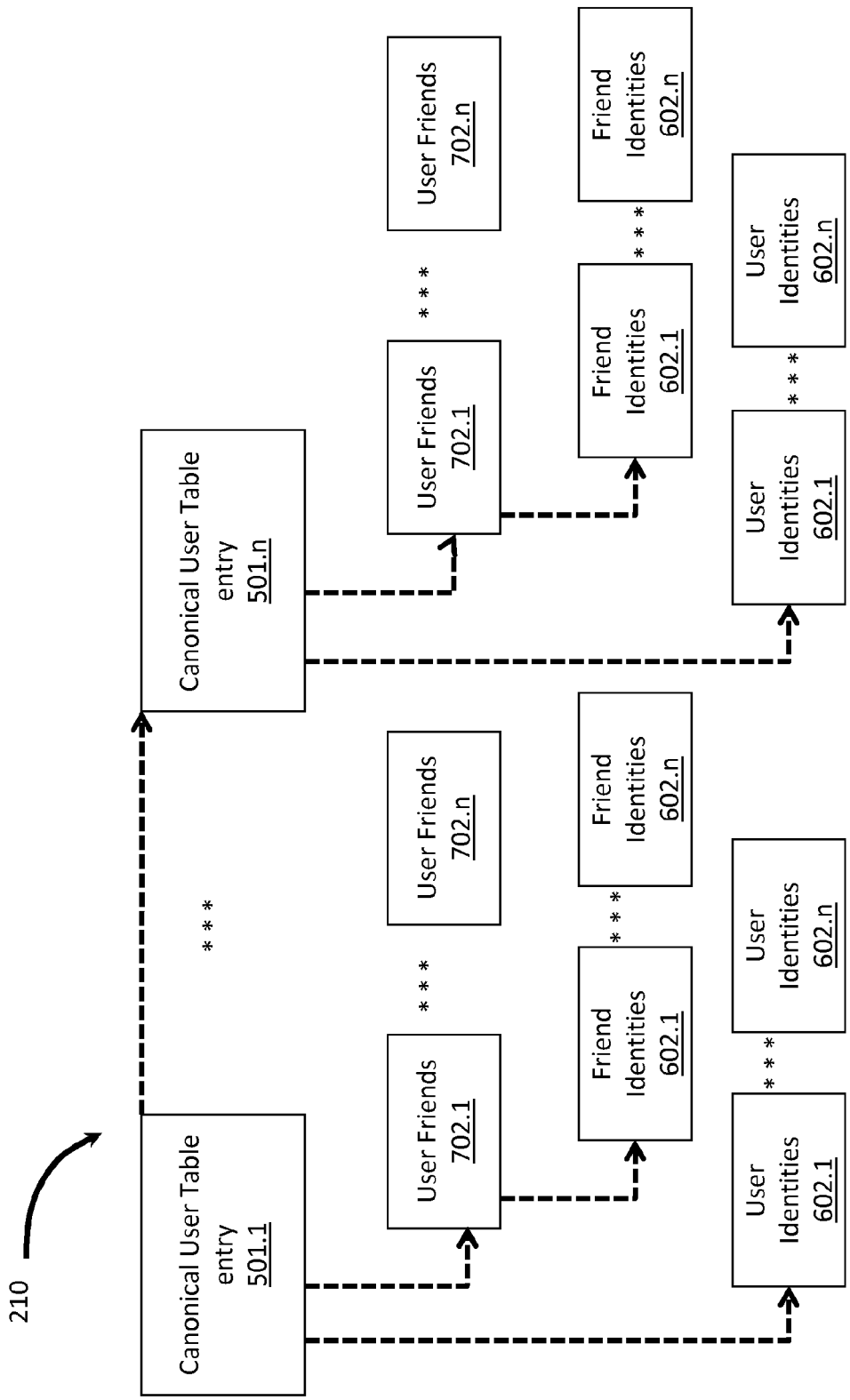
FIG. 10 depicts a canonical user table entry for practicing a method of the invention.
Figures 1, 10:
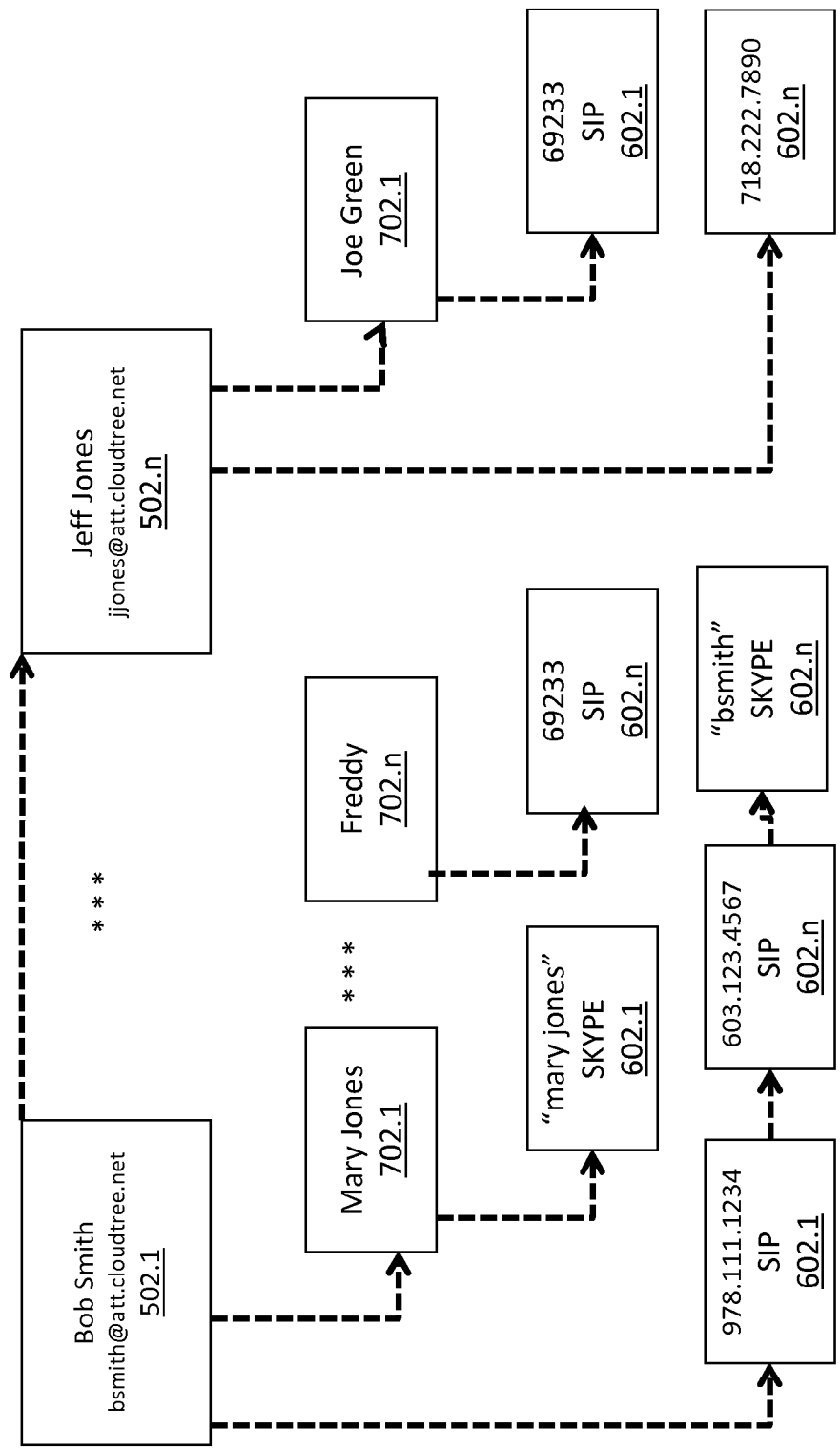
Figures 2, 10:
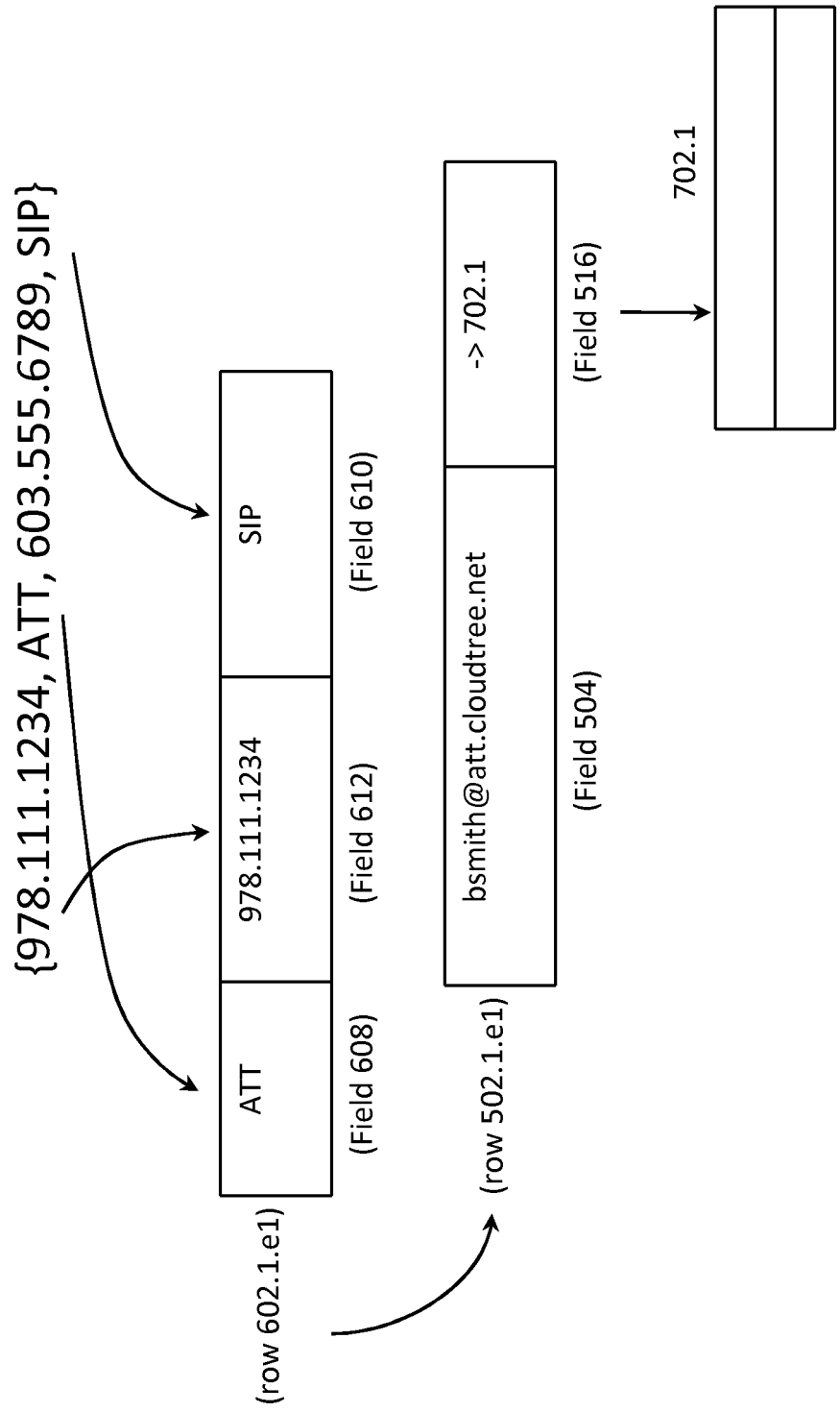

The user name identity mapping database 210 contains the canonical user table 502, shown in FIG. 5, an Identity Table 602, shown in FIG. 6, and a Friends Mapping Table 702, shown in FIG. 7. Each of these tables inside the user name identity mapping database 210 may be implemented as a link list structure, a distributed data object cache, a relational database, or with other methods of storage and retrieval well known in the art. FIG. 10 shows how these data structures are logically interconnected within the identity mapping database 210. For each entry 501.$n$ in the canonical user table 502 there is a user identities list 514, and a User Friends list 516 which in turn has a Friend Identities list of its own. The user identities list and the friends list uses the same structure (602) to list the identities where User Identities Field 514 is the list of identities for the user; and User Friends Field 516 is the list of identities for the friends.

Because the canonical user table 502 maintains a separate configuration of canonical identities or entries 501.$n$, as shown in FIG. 5, by carrier instance, each canonical identity is thereby unique by carrier. For example, the user named Bill Smith could have two e-mail addresses used as two canonical identifiers that would be separate entries for, respectively, a "bsmith@att.cloudtree.net" and a "bsmith@bell.cloudtree.net" so each user would have an entry that is unique by carrier "att" and carrier "bell" within the user name identity mapping database 210. Each Canonical User Identity field 504 is uniquely defined, along with the User Carrier Instance field 506, a User Display Name field 508, a User UUID field 510, a User Credentials field 512, a User Identities List field 514, and a User Friends List field 516. Each canonical identity maintains its mapping to a globally unique identifier field, or UUID field used internally by translation server 110, and formed using procedures well-known in the art for establishing global uniqueness and described above.

The User Identities list field 514 points to the corresponding identity table 602, as shown in FIG. 6, and is used to define the various identities mapped to a user canonical identity 504.

Thus, for example, in the entry 502.1.$e1$, shown in FIG. 5-1, the User Identities List Field value points to "602.1" which is the Identity Table 602.1 shown in FIG. 6-1. The Identity Table 602.1 is a list of identities within the context of the identity protocol corresponding to "bsmith@att.cloudtree.net." This could be, for example, a list of all the SIP identities and a list of all the Skype identities. The identity UUID provides a direct match on a particular identity detail, so the system does not have to replicate storing all the details in other data elements.

The identity table 602 contains an entry 601.$n$ for each identity mapping that is configured, mapped, or defined to a specific user. The Identity Count field 604 indicates how many entries 601 exist in the identity table 602. Each entry 601 contains an Identity UUID field 606, an Identity Carrier Instance field 608, an Identity Protocol ID field 610, an Identity URI Value field 612, an Identity Type Endpoint Device field 614, an Identity Codec field 616, an Identity Presence Status field 618, an Identity Access Filter field 620, and an Identity Mapping field 622.

The User Friends list field 516 points to a corresponding Friends Mapping Table 702, as shown in FIG. 7, and is used to define the various identities mapped to a user's friends. For example, in entry 502.1.$e1$, shown in FIG. 5-1, the User Friends List field 516 points to "702.1" which is the Friends list corresponding to "bsmith@att.cloudtree.net."

The friends mapping table 702 contains an entry 703 for each identity mapping that is configured, mapped, or defined to a specific friend of a user canonical identity 504. The Friend Count field 704 indicates how many entries exist in the Friends mapping table 702. Each entry contains a Friend Display name field 706, a Friend UUID field 708, and a Friend Identities List field 710.

The Friend UUID field 708 is a globally unique identifier field, used internally by the translation server 110, and formed using procedures well-known in the art for establishing global uniqueness as described above.

The context mapping database 220 is defined by a context table 902, shown in FIG. 9, which defines the carrier identities and protocol identities used to establish the processing context for a communications exchange.

As shown in FIG. 9, each entry 903.*n* in the context table 902 contains a Carrier ID field 904, a Carrier Display Name field 906, a Primary Trunk ID field 908, a Secondary Trunk ID field 910, and an Authentication field 912. The Primary Trunk ID field 908 and Secondary Trunk ID field 910 are indexes into the identity table 602, as represented, for example, by Context Table 902.1 shown in FIG. 9-1, providing additional carrier and protocol detail information associated with each Primary Trunk ID field entry and Secondary Trunk ID field entry.

The context mapping database 220 may be implemented as a link list structure, a distributed data object cache, a relational database, or with other methods of storage and retrieval well known in the art.

The mapping entry table 802, FIG. 8, contains details on the policy rules for the identity mapping. An In-identity UUID field 806 indicates the source identity to use; an out-identity UUID field 808 indicates what destination identity to use; a Priority field 810 indicates the priority ordering of this mapping rule; Serial or Parallel field 812 indicates if the mapping rule is processed in parallel or serial with other mapping entries within the mapping entry table 802; and a Permit-Deny Schedule field 814 provides what day and time the rule is enforced, along with any authorization codes. The function of the UUID field has been described above.

Together, the user name identity mapping database 210, the context mapping database 220 and the tuple policy table 212 are used to support the identity translation processing 204 for practicing the method of the invention.

The overall relationship of the data structures used to support the user name identity mapping database is depicted in FIG. 10 and shown by example in FIGS. 10-1 and 10-2

Figure 11:
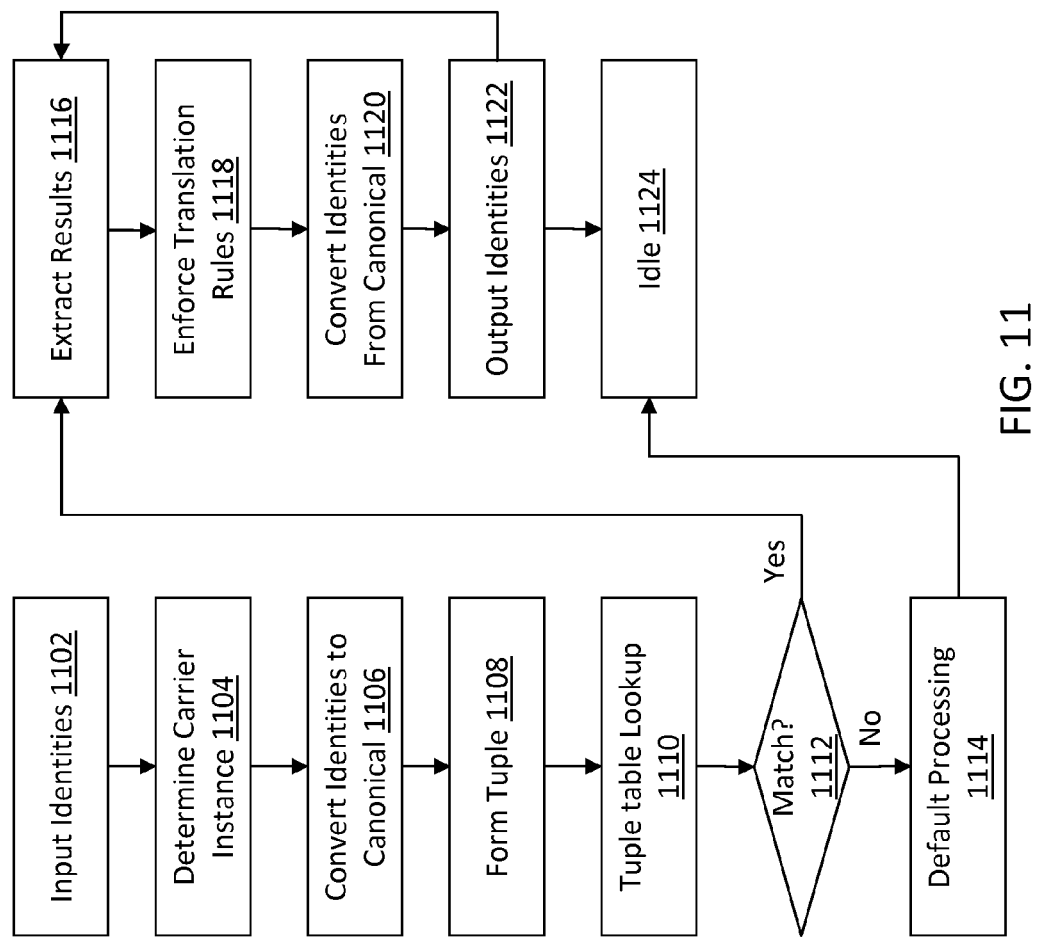
FIG. 11 depicts a process flow for mapping identities for practicing a method of the invention.

The method of the invention enables user-defined identities to be mapped following the processing flow depicted in FIG. 11.

First, step 1102, an input In-Identifier 214 is used to determine, step 1104, the carrier ID 904 which may be explicit or implicit. In SIP trunking, for example, each carrier instance will have a specific set of servers that transmit identities for processing to the translation server 110, in which the primary trunk ID 908 or the secondary trunk ID 910 can be used to identify the carrier ID 904 by looking up in the context mapping database 220. The input in-identities may be contained in a signaling protocol, call control, packets, or some other means, in which case the carrier instance information will be extracted or determined, and then used as a lookup means in the context mapping database 220. Once a carrier ID 904 is determined, it can then be used to form a unique key lookup as part of the qualifier in the user name identity mapping database 210 and in forming unique tuple keys 400 for the tuple policy table 212. When no carrier instance is used, then the identity mapping can have a global (independent of a specific carrier) context, instead of a specific carrier ID instance.

In a standard communication exchange, the originating in-identifier 214 may be considered the source, originator, or calling party and the destination in-identifier 214 may be considered the destination, or called party of the communications exchange.

To convert identities to canonical values, step 1106, each in-identifier 214 is converted into a canonical format by looking up the source or originating in-identifier in the user name identity mapping database 210 to determine if there is a registered user corresponding to this originating in-identity. This lookup may be accomplished with a hash lookup or may follow a linked list of entries in order to find and match a specific entry with a matching value. Once a matching identity value is found, then its canonical value can be formed from the User Canonical Identity field 504.

When a user name identity mapping entry is found, then the list of friends for the user can be searched for a matching identity value of the called party in-identifier. This lookup may be accomplished with a hash lookup or by following a linked list of entries in order to find and match a specific entry with a matching value. Once a matching identity value for the called party in-identifier is found, then its canonical value can also be formed.

The tuple key 400 is then formed, step 1108, using the carrier instance 402, the context of the originating communication (e.g., SIP or Skype), in conjunction with the canonical identity of the calling party_404 and the canonical identity of the called party 406.

Once a tuple key 400 is formed, then the translation mapping can be looked up, step 1110, in the tuple policy table 212.

If there is no match for the tuple key, step 1112, then default processing step 1114 is performed. Default processing may include creating a new entry for the tuple policy table 302, using the formed tuple key 400 or by applying default mapping rules for a partially-specified instance key. A partial instance key may require additional processing by clearing portions of the key (such as the called party canonical identity 406 to find a default entry for the carrier instance 402 and calling party canonical identity 404).

If there is a match at step 1112 then the translation processing uses the resulting entry to extract results, step 1116, and enforce translation rules, step 1118. Each result entry in the tuple policy table 302 contains the parallel mapping 306 and serial mapping 308 to be applied by the translation processing.

As above, each of the translation mappings to be applied in parallel and in serial are defined by the mapping table 802. Each entry in the mapping table 802 contain UUIDs for the in-identity and out identity, which in turn index into the specific identity table 602 providing all of the detailed mappings for the communication exchange, along with the priority and permit-deny schedule. These together define the identity mapping translation and the policy rule for the specific mapping translation.

For each identity to map, the translation processing converts the identity from canonical, step 1120, to the specific mapping and protocol specified in the identities entry in the appropriate Identity Table 602 for the canonical identity of the result. The codec identity 616 is also noted.

Then the out-identifier 218 is formed and output from the identity translation processing 204. This processing may apply to both the calling party and the called party in a communication exchange. If there is more than one identity to process in output identities, step 1122, then the cycle continues again to extract results, step 1116.

Once all results for the tuple policy table entry have been processed, the identity mapping returns to idle, step 1124.

Figure 12:
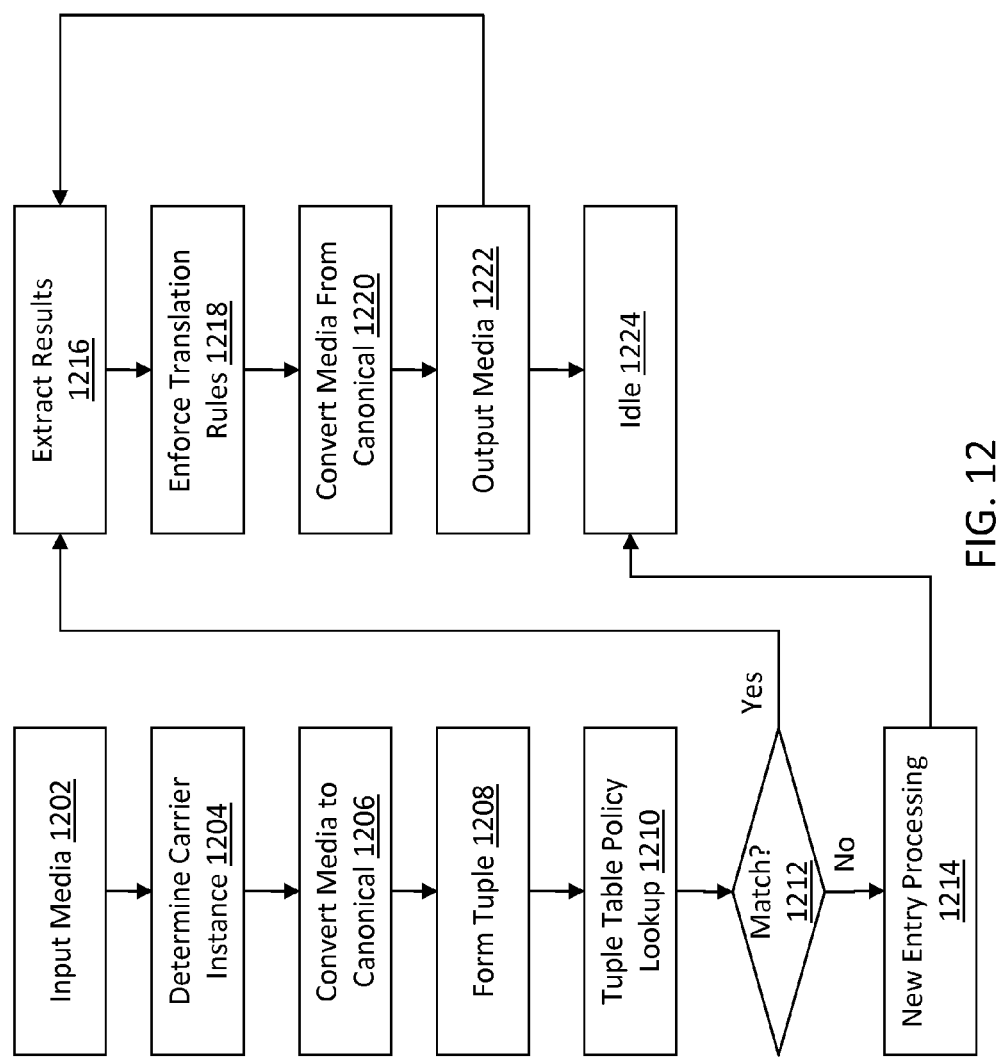
FIG. 12 depicts a process flow for mapping bearer channel media for practicing a method of the invention.

Media mapping functions similarly to the identity mapping, except instead of translating an in-identifier 214 to an out-identifier 218, an in-media 216 is translated to an out-media 220 using the codec identifier 616 that was noted. Thus, referring to FIG. 12, steps 1202 and 1204 correspond to steps 1102 and 1104, respectively. Next, at step 1206, each media in-identifier is converted into a canonical format. Steps 1208-1212 correspond to steps 1108-1112. At step 1214, new entry processing, similar to the default processing in step 1114 is performed. Steps 1216 and 1218 correspond to steps 116 and 1118. At step 1220, media is converted from the canonical format and output at step 1222 and then idle at step 1224, similar to step 1124.

By way of a non-limiting example, an embodiment of the present invention will be demonstrated as follows.

In this example, referring to FIGS. 5-1, 6-1, 6-2, 6-3, 6-4, 7-1, 7-2, 8-1, 9-1, 10-1, a user named Bob Smith (with a canonical identity of "bsmith@att.cloudtree.net") has defined a phone number 603.555.6789 to connect to his friend Mary Jones (with a canonical identity of "mjones@att.cloudtree.net") on Skype, whose unique Skype name, or identifier, is "maryjones" on the Skype network. It should be noted that bsmith@att.cloudtree.net is canonical because the one value is unique which then maps to one or more other identities. Alternatively, the system can generate a UUID from that value and make the UUID the canonical ID as well. The system is establishing a guaranteed unique value that it then maps to alternate identities.

Bob Smith has a prepaid cell phone with the phone number 978.111.1234 from AT&T with just a voice minutes plan, i.e., no data plan, and dials the phone number 603.555.6789. The AT&T carrier network routes the call from its carrier server to the assigned translation server 110 practicing the method of the present invention. The call signaling uses the SIP protocol and formats the calling party as Bob Smith's phone number 978.111.1234, and the called party as the destination phone number 603.555.6789, which was dialed by Bob.

The translation server 110 receives the SIP protocol message (containing the calling party phone number of 978.111.1234 and the called party phone number of 603.555.6789) from the AT&T server and first determines the carrier ID 904 to be AT&T by searching the context table 902 of the context mapping database 220 for a matching primary 908 or secondary 910 trunk ID obtained either explicitly from the inbound SIP protocol message or implicitly from the binding of messages to the translation server 110 (configured a priori with carrier network information). The translation server 110 also extracts the calling party 404 and called party 406 identifiers from the SIP protocol message. Using the calling party phone number, i.e., 978.111.1234, it now searches the user name identity mapping database 210 for a matching entry of the Identity URI (Universal Resource Identifier) field 612 contained in the Identity table 602. A match is determined when the Identity Carrier Instance field 608, the Identity Protocol ID field 610, and the Identity URI Value field 612 match the information extracted from the SIP protocol (SIP protocol with a calling party value of 978.111.1234) and carrier ID for AT&T. In the example, this matches entry 602.1.e1 in Identity Table 602-1.

The matching user entry 602.1.e1 is found in Identity Table 602.1 for the entry yielding the canonical identity of "bsmith@att.cloudtree.net," as it's pointed to by entry 502.1.e1 in Canonical User Table 502.1. So a canonical identity of "bsmith@att.cloudtree.net" is used in order to have a canonical representation of the calling party identity. Once the calling party canonical identity is formed, it is then used to find all of the friends defined for "bsmith@att.cloudtree.net" by searching the list of Friends pointed to in the User Friends List field 516 which is the Friends mapping table 702.1 for "bsmith@att.cloudtree.net," containing each friend's identities. Each friend is then searched for a list of identities until a matching identity is found for the calling party phone number of 603.555.6789.

A matching identity is found with Bob's friend Mary Jones in Identity Table 602.3 having a canonical identity of mjones@att.cloudtree.net. Thus, once a list of friends for a user has been obtained, then the system can access different identities for each friend in the list.

Now a tuple key is formed using the AT&T carrier instance ID, the SIP protocol as the context, the calling party canonical identity of "bsmith@att.cloudtree.net" and the called party canonical identity of "mjones@att.cloudtree.net." This newly formed key is then used to find an exact match entry in the tuple policy table 302 yielding a result containing the list of identities and rules allowed on this communications exchange.

Using a tuple of {ATT, SIP, "bsmith@ att.cloudtree.net," "mjones@att.cloudtree.net"}, the lookup in the Tuple Policy table yields an entry containing the detailed mapping information for the in-identity and the out-identity for the communications exchange. In this case, mapping the called party phone number maps to a Skype identity of "maryjones" for the "virtual" phone number defined as 603.555.6789. Thus, because the table stores the canonical value, the system can then use the canonical value to find an entry in the canonical user table, with in turn provides a list of user identities and a list of friends. The list of friends, in turn, provides a list of friends' identities]

Once the Skype information is obtained, the binding to the appropriate Skype codec is also obtained for the media conversion once the call is established.

So, by way of example, the translation server mapped a user-defined phone number of 603.555.6789 to "maryjones" at Skype for the call originated by Bob Smith when he dialed the number 603.555.6789 he assigned to his friend Mary Jones.

By way of another example, the present invention will be demonstrated as follows.

In this new example, the same user Bob Smith ("bsmith@att.cloudtree.net") has defined a mnemonic "mybff" (by using the phone alphanumeric mappings of 69233 on his keypad) for his best friend Freddy.

Bob Smith has the same prepaid cell phone, 978.111.1234, from AT&T, with just a voice minutes plan and he dials the mnemonic "mybff." The AT&T carrier network routes the call from their media server to the assigned translation server practicing the method of this present invention. The call signaling uses the SIP protocol and formats the SIP INVITE protocol message containing the calling party as Bob Smith's phone number (978.111.1234) and the called party phone number as 69233 as the destination mnemonic "mybff" which was dialed by Bob.

The translation server 110 receives the SIP protocol message (containing the calling party phone number of 978.111.1234 and the called party phone number of 69233) from the AT&T server and first determines the carrier ID 904 to be AT&T by searching the context table 902 of the context mapping database 220 for a matching primary 908 or secondary 910 trunk ID obtained explicitly from the inbound SIP protocol message or implicitly from the binding of messages to the translation server 110 (configured a priori with carrier network information). The translation server 110 also extracts the calling party 404 and called party 406 identifiers from the SIP protocol message. Using the calling party phone number, i.e., 978.111.1234, it now searches the user name identity mapping database 210 for a matching entry of the User Identities field 612 contained in the Identity Table 602. The database 210 contains an instance of the structure 602, which contains context-specific identities such as, for example, based on SIP protocol identities. A match is determined when the Identity Carrier Instance field 608, the Identity Protocol ID field 610, and the Identity URI Value field 612 match the information extracted from the SIP protocol, i.e., SIP protocol, with a calling party value of 978.111.1234) and carrier ID for AT&T.

A matching user entry is found for the entry yielding the canonical identity of "bsmith@att.cloudtree.net," so a canonical identity of "bsmith@att.cloudtree.net" is used in order to have a canonical representation of the calling party identity. Once the calling party canonical identity is formed, it is then used to find all of the friends defined for "bsmith@att.cloudtree.net" by searching the User Friends List field 516 which is the Friends mapping table 702, containing each friend's identities. Each friend is then searched for a list of identities until a matching identity is found for the calling party phone number of 69233.

A matching identity is found with Bob's friend Freddy having a canonical identity of "freddy@att.cloudtree.net."

Now a tuple key is formed using the AT&T carrier instance id, the SIP protocol as the context, the calling party canonical identity of "bsmith@att.cloudtree.net" and the called party canonical identity of "freddy@att.cloudtree.net." This newly formed key is then used to find an exact match entry in the tuple policy table 302 yielding a result containing the list of identities and rules allowed on this communications exchange.

Using a tuple of {ATT, SIP, "bsmith@ att.cloudtree.net," "freddy@att.cloudtree.net"}, the lookup yields an entry, containing the detailed mapping information for the in-identity and the out-identity for the communications exchange. In this case, mapping the called party phone number maps to a SIP identity of 978.111.2345 for the "virtual" phone number defined as "mybff" or 69233. Once the identity information is obtained, the binding to the appropriate voice codec is also obtained for the media conversion once the call is established.

So, by way of example, the translation server mapped a user-defined phone number of "mybff" to the actual phone number 978.111.2345, originated by Bob Smith when he dialed the "mybff" number he assigned to his friend Freddy.

In this case, mapping the called party phone number maps to a SIP canonical identity of "freddy@att.cloudtree.net" for the "virtual" phone number defined as "mybff." The source SIP identity is also given for "bsmith@att.cloudtree.net," for example, to insert the caller-id phone number. Once the SIP information is obtained, the binding to the voice appropriate codec, such as G.711, is also obtained for the media conversion once the call is established.

So, by way of example, the translation server mapped a user-defined mnemonic phone number of "mybff" to Freddy for the caller Bob Smith.

In another example, a different user Jeff Jones, who has a canonical name of "Jones@att.cloudtree.net" has defined a mnemonic "mybff" as his best friend Joe Green.

The user Jeff Jones has a postpaid cell phone with a phone number of 781.222.7890 from AT&T, no data plan, just voice minutes and also dials the mnemonic "mybff."

The AT&T carrier network routes the call from its media server to the assigned translation server practicing the method of this invention. The call signaling uses the SIP protocol and formats the SIP INVITE protocol message containing the calling party as Jeff Jones's phone number (718.222.7890) and the called party phone number as 69233 as the destination mnemonic "mybff" which was dialed by Jeff.

The translation server 110 receives the SIP protocol message (containing the calling party phone number of 718.222.7890 and the called party phone number of 69233) from the AT&T server and first determines the carrier ID 904 to be AT&T by searching the context table 902 of the context mapping database 220 for a matching primary 908 or secondary trunk 910 ID obtained either explicitly from the inbound SIP protocol message or implicitly from the binding of messages to the translation server 110 (configured a priori with carrier network information). The translation server 110 also extracts the calling party 404 and called party 406 identifiers from the SIP protocol message. Using the calling party phone number, i.e., 718.222.7890, it now searches the user name identity mapping database 210 for a matching entry of the User Identities field 612 contained in the identity table 602. A match is determined when the Identity Carrier Instance field 608, the Identity Protocol ID field 610, and the Identity URI Value field 612 match the information extracted from the SIP protocol (SIP protocol with a calling party value of 718.222.7890) and carrier ID for AT&T.

A matching user entry is found for the entry yielding the canonical identity of "Jones@att.cloudtree.net," so a canonical identity of "Jones@att.cloudtree.net" is used in order to have a canonical representation of the calling party identity. Once the calling party canonical identity is formed, it is then used to find all of the friends defined for "Jones@att.cloudtree.net" by searching the User Friends field 516, which is in the Friends mapping table 702, where the field 516 is a data structure of the 702 table listing the friends, containing each friend's identities. Each friend is then searched for a list of identities until a matching identity is found for the calling party phone number of 69233, for example, the field 612 URI value.

A matching identity is found with Jeff's friend Joe Green having a canonical identity of "jgreen@att.cloudtree.net."

Now a tuple key is formed using the AT&T carrier instance ID, the SIP protocol as the context, the calling party canonical identity of "Jones@att.cloudtree.net" and the called party canonical identity of "jgreen@att.cloudtree.net." This newly formed key is then used to find an exact match entry in the tuple policy table 302 yielding a result containing the list of identities and rules allowed on this communications exchange.

If the tuple of {ATT, SIP, "jjones@ att.cloudtree.net", "jgreen@att.cloudtree.net"} is a valid tuple, the lookup yields an entry, containing the detailed mapping information for the in-identity and the out-identity for the communications exchange. In this case, mapping the called party phone number maps to a SIP identity of 718.222.3344 for the "virtual" phone number defined as "mybff" or 69233. Once the identity information is obtained, the binding to the appropriate voice codec is also obtained for the media conversion once the call is established.

So, by way of example, the translation server mapped a user-defined phone number of "mybff" to the phone number 718.222.3344, originated by Jeff Jones when he dialed the "mybff" number he assigned to his friend Joe Green.

In this case, mapping the called party phone number maps to a SIP canonical identity of "jgreen@att.cloudtree.net" for the "virtual" phone number defined as "mybff." The source SIP identity is also given for "Jones@att.cloudtree.net", for example, to insert the caller-id phone number. Once the SIP information is obtained, the binding to the voice appropriate codec, such as G.711 is also obtained for the media conversion once the call is established.

So, by way of example, the translation server mapped a user-defined mnemonic phone number of "mybff" to Joe Green for the caller Jeff Jones.

In a computer system embodiment of the present invention, a processor that executes instructions and machine-readable storage media having instructions stored therein are provided. The processor, when executing the stored instructions, implements a method of connecting a calling party to a called party. The method of connecting a calling party to a called party comprises:

receiving, from a first calling party, a first initiated call including a first calling party identifier and a first called party identifier corresponding to a first called party;

determining a first carrier identifier and a first protocol ID corresponding to the first initiated call;

determining a first canonical calling party identifier corresponding to the first calling party identifier;

determining a first canonical called party identifier corresponding to the first called party identifier, the determination of the first canonical called party identifier being a function of the first canonical calling party identifier;

determining a first set of one or more policies for connecting the first calling party to the first called party as a function of the first carrier identifier, the first protocol ID, the first canonical calling party identifier and the first canonical called party identifier; and completing the first initiated call, by connecting the first calling party to the first called party as per one or more of the determined policies in the first set.

The computer system may further comprise a context mapping database; a username identity mapping database; and a tuple policy table. Further, the method may comprise accessing one or more of the context mapping database, the username identity mapping database and the tuple policy table when determining one or more of the first canonical calling party identifier, the first canonical called party identifier, the first set of policies, the first protocol ID and the first carrier identifier.

In one embodiment of the present invention, a virtual private phone number could be assigned between two users. A virtual private phone number would only allow the user-defined calling party and called party to communicate. Each user could originate a call to the virtual private phone number and it would connect the two users. In this fashion, each user dials the same phone number, yet each connects to the other user.

In another embodiment of the present invention, a virtual private phone number could be assigned to a group of users. When any user in the group dials the number, the user would connect to all other users. Each user in the group, when dialing the same number, would also connect to the rest of the users in the group.

In another embodiment of the present invention, parental controls can be enforced for a child's cell phone. By defining policies that restrict calling party and called party combinations, all phone calls to and from the child's cell phone can be enforced with specific policies. For example, only user-defined friends and family members can be connected with the child's phone. In certain cases, a non user-defined number may be allowed to connect by supplying a specified authorization code.

In another embodiment of the present invention, operation of a child's phone could be restricted by days of week or time of day. For example, no phone calls other than family members during school hours.

In another embodiment of the present invention, a configured identity can be placed in the calling party field of any phone call signaling for the caller id. This enables mapping of any identity to a caller id.

In another embodiment of the present invention, a user-defined phone number could be assigned to a user not connected on the same type of media or signaling plane, such as a phone network connecting to a Skype network. For instance, an originating user could define a phone number that maps to a specific Skype user name on the Skype network as the called party. By dialing the user-defined phone number, the originating user can connect to the Skype user, even though not directly connected on Skype. The user-defined number is unique to the originating user. Any network that supports voice communications could be supported. For instance, a user-defined phone number could be assigned to each friend on Facebook®. When a call is made to one of the user-defined phone numbers, a chat message with a link to a "soft phone" could be posted on the friend's Facebook wall. When the link is executed, a phone call is established.

In another embodiment of the present invention, a user could define a single phone number used to call each friend, family member, work associate, or anyone else on the same carrier network, over other carrier networks, voice applications or social networks.

In another embodiment of the present invention, international calls could be made without incurring any long-distance charges or termination fees by mapping a "local" phone number to a Skype endpoint in another country, then having that Skype endpoint in turn map to a "local" in-country phone number, so that the long-distance portion of the call is over the free calling of Skype. Thus, a local called party number, dialed by a specific calling party connects via the translation server to a Skype endpoint. Currently, the Skype service is Skype-to-Skype or Skype to a specific PSTN number.]

In another embodiment of the present invention, a virtual private phone number could be assigned between two users for text messaging. A virtual private phone number would only allow the user-defined calling party and called party to communicate with text messaging. Each user could originate a text to the virtual private phone number and it would text message between the two users. In this fashion, each user text messages to the same phone number, yet each text message goes to the other user.

In another embodiment of the present invention, a virtual private phone number could be assigned to a group of users for sending text messages to the whole group. When any user in the group sends a text message to the number, the user would text message to all other users. Each user in the group, when text messaging to the same number, would also send a text message to the rest of the users in the group.

In another embodiment of the present invention, parental controls for text messaging can be enforced for a child's cell phone. By defining policies that restrict calling party and called party combinations, all text messages to and from the child's cell phone can be enforced with specific policies. For example, only user-defined friends and family members can be connected with the child's phone for text messaging. In certain cases, a non user-defined number may be allowed to text message by supplying a specified authorization code.

In another embodiment of the present invention, a child's phone could be restricted for text messaging by days of week or time of day. For example, no text messages other than to and from family members during school hours.

In another embodiment of the present invention, a configured identity can be placed in the calling party field of any text message. This enables mapping of any identity to a caller id source.

In another embodiment of the present invention, a user-defined phone number could be assigned to a user not connected on the same type of media or signaling plane, such as a phone network connecting to a Skype network. For instance, an originating user could define a phone number that maps to a specific Skype user name on the Skype network as the called party. By text messaging the user-defined phone number, the originating user can send chat messages to the Skype user, even though not directly connected on Skype. The user-defined number is unique to the originating user. Any network that supports text messaging or chat communications could be supported. For instance, a user-defined phone number could be assigned to each friend on Facebook. When a text message is sent to the user-defined phone number, a message could be posted on the friend's Facebook wall.

In another embodiment of the present invention, video calls can be made between entities using different identities and video codecs.

In another embodiment of the present invention, video messaging can be made between entities using different identities and video codecs.

In another embodiment of the present invention, video communication can be converted to audio or text communications.

It is understood that the embodiments described hereinabove are merely illustrative and are not intended to limit the scope of the invention. Other implementations will occur to those skilled in the art. It is realized that those skilled in the art can make various changes, alterations, rearrangements and modifications without substantially departing from the spirit and scope of the present invention.

What is claimed:

1. A method of connecting a calling party to a called party, the method comprising:
    receiving, from a first calling party, a first initiated call including a first calling party identifier and a first called party identifier corresponding to a first called party;
    determining a first carrier identifier and a first protocol ID corresponding to the first initiated call;
    determining a first canonical calling party identifier corresponding to the first calling party identifier;
    determining a first canonical called party identifier corresponding to the first called party identifier, the determination of the first canonical called party identifier being a function of the first canonical calling party identifier;
    determining a first set of one or more policies for connecting the first calling party to the first called party as a function of the first carrier identifier, the first protocol ID, the first canonical calling party identifier and the first canonical called party identifier; and
    completing the first initiated call, by connecting the first calling party to the first called party as per one or more of the determined policies in the first set.

2. The method of claim 1, wherein:
    at least one of determining the canonical calling party identifier and determining the canonical called party identifier comprises accessing a lookup table.

3. The method of claim 1, wherein:
    the first calling party identifier is one of: a phone number, an e-mail address, a username and a mnemonic chosen by the first calling party.

4. The method of claim 1, wherein:
    the first called party identifier is one of: a phone number, an e-mail address, a username and a mnemonic chosen by the first calling party.

5. The method of claim 1, wherein the first calling party and the first called party are on first and second carrier networks, respectively.

6. The method of claim 5, wherein the first carrier network is not the same as the second carrier network.

7. The method of claim 5, wherein the first carrier network is not the same type as the second carrier network.

8. The method of claim 7, wherein the first carrier network is one of: a wireless phone network, a wired phone network, an internet, a public network, a private network, an application specific network, and a proprietary network.

9. The method of claim 1, further comprising:
    receiving, from a second calling party, a second initiated call including a second calling party identifier and a second called party identifier corresponding to a second called party;
    determining a second carrier identifier and a second protocol ID corresponding to the second initiated call;
    determining a second canonical calling party identifier corresponding to the second calling party identifier;
    determining a second canonical called party identifier corresponding to the second called party identifier, the determination of the second canonical called party identifier being a function of the second canonical calling party identifier;
    determining a second set of one or more policies for connecting the second calling party to the second called party as a function of the second carrier identifier, the second protocol ID, the second canonical calling party identifier and the second canonical called party identifier; and
    completing the second initiated call, by connecting the second calling party to the second called party as per one or more of the determined policies in the second set,
    wherein the first called party identifier is the same as the second called party identifier, and
    wherein the first called party and the second called party are not the same.

10. The method of claim 9, wherein the second called party identifier is one of: a phone number, an e-mail address, a username and a mnemonic chosen by the second calling party.

11. A computer system comprising:
a processor that executes instructions; and
machine-readable storage media having instructions stored therein, the instructions, when executed by the processor, causing the computer system to implement a method of connecting a calling party to a called party, the method comprising:
    receiving, from a first calling party, a first initiated call including a first calling party identifier and a first called party identifier corresponding to a first called party;
    determining a first carrier identifier and a first protocol ID corresponding to the first initiated call;
    determining a first canonical calling party identifier corresponding to the first calling party identifier;
    determining a first canonical called party identifier corresponding to the first called party identifier, the determination of the first canonical called party identifier being a function of the first canonical calling party identifier;

determining a first set of one or more policies for connecting the first calling party to the first called party as a function of the first carrier identifier, the first protocol ID, the first canonical calling party identifier and the first canonical called party identifier; and completing the first initiated call, by connecting the first calling party to the first called party as per one or more of the determined policies in the first set.

12. The computer system of claim 11, further comprising:

a context mapping database;

a username identity mapping database; and a tuple policy table, wherein the method further comprises:

accessing one or more of the context mapping database, the username identity mapping database and the tuple policy table when determining one or more of the first canonical calling party identifier, the first canonical called party identifier, the first set of policies, the first protocol ID and the first carrier identifier.

* * * * *